Patented Jan. 26, 1937

2,068,850

UNITED STATES PATENT OFFICE 2,068,850

PROCESS OF IMPROVING GASOLINE

Carleton Ellis, Montclair, N. J., assignor to Standard Oil Development Company, a corporation of Delaware No Drawing. Application September 1, 1932, Serial No. 631,371

5 Claims. (Cl. 196—39)

My invention relates to a process for the improvement of gasoline, oil, or other petroleum hydrocarbons and particularly to the improvement of the stability of such stocks made by the cracking of petroleum distillates with respect to oxidation, gum formation, sludge formation, and color.

It is one of the chief objects of the present invention to stabilize gasoline and other petroleum distillates against this gum formation. Another object is to accomplish this stabilization without any undue loss of valuable ingredients which tend to prevent knocking when such gasoline is used as a fuel in internal combustion engines. These and other objects will be apparent from the following description.

Broadly, my invention consists in treating the gasoline or other petroleum hydrocarbon, such as a cracked gasoline, with a substance which reacts with the more active unsaturated hydrocarbons present in the gasoline particularly those, such as conjugated diolefines, which are capable of forming peroxides and thereby increasing the gum or sludge content of the stock. The reaction products are difficultly soluble in the gasoline or other distillates and may be separated by filtration if in large quantities, or possess such high boiling points that they are easily separated by the simple step of distillation or they may be removed by filtration after treating with dilute alkaline solutions. I have found that the reaction products formed contain certain compounds such as substituted phthalic acids, etc. which have uses outside of the petroleum field.

Some of the substances which I have found suitable for carrying out this invention are organic compounds containing the grouping represented by =CH—CO— such as occur in unsaturated organic acids, aldehydes and other compounds or their anhydrides.

According to this invention, one method of treating to improve the stability of the stock is to add a quantity of maleic anhydride to the stock and agitate the mixture for several hours with or without the application of heat. At the end of this period the excess anhydride is removed, together with any insoluble products, by any convenient means, as for example by filtration. The acid reaction products remaining dissolved in the gasoline or other petroleum distillate are removed by washing with a dilute alkaline solution. Alkalies which may be used are, for example, sodium hydroxide, sodium carbonate, sodium bicarbonate, calcium hydroxide and the like. This does not preclude the precipitation of the acid products, in some instances, by means of gaseous ammonia.

The process may be modified in the following manner. The maleic anhydride is added to a cracked distillate and the mixture heated for several hours under a reflux condenser. The temperature of course is the boiling temperature of the hydrocarbon being treated, and should not ordinarily go much above 200° C., unless the heating is done under pressure. The excess maleic anhydride and/or reaction products are removed as previously mentioned. With some distillates, particularly those having a rather low boiling range, it may be preferable to carry out the heating under pressure.

I may further modify my process in that after removing the excess maleic anhydride and/or insoluble reaction products the treated stock may be distilled. If desired the distillate so obtained may be given a dilute alkaline wash, as for example, with a solution of sodium carbonate or sodium hydroxide. Also, if desired, the maleic anhydride or other material having the grouping =CH—CO— may be added in solution in any suitable solvent substantially immiscible with the petroleum hydrocarbon, such as methanol, ethanol, toluene, and the like. After scrubbing with this solution, and separation, the reagent may be recovered and used repeatedly for further treatments.

As a still further modification of the invention, the treatment may be carried out by passing the gasoline in vapor or liquid phase at any required temperature through a filter bed or layer of purifying material such as clay, charcoal, silica gel, etc., coated with maleic anhydride. A filter bed internally heated may be used advantageously for this purpose.

The following will serve as illustrations of the effects produced on petroleum hydrocarbons by my process.

*Example 1.*—To gasoline, which consisted of a mixture of straight run gasoline and of cracked gasoline, was added an excess of maleic anhydride and the mixture heated under a reflux condenser for 5 hours. At the end of this time the excess anhydride and reaction products were removed by washing with sodium hydroxide solution. The stability of the gasoline towards oxidation, or gum formation, as measured by the well-known breakdown test was increased from about 2 hours to 6.2 hours by this treatment.

*Example 2.*—To a vapor phase cracked distillate was added excess maleic anhydride and the mixture treated as in Example 1. After the removal of the excess anhydride and reaction products the treated distillate was distilled to yield gasoline of a definite end-point. The untreated distillate was also distilled to yield gasoline of the same end point. The breakdown test for the latter gasoline was 0.3 hour, while for the gasoline obtained from the treated distillate it was 6.5 hours.

Example 3.—A cracked petroleum distillate, from which the lower boiling fractions had been removed by distillation, was treated with 0.1 percent by weight of maleic anhydride as described in Example 1. The excess anhydride and reaction products were removed by means of a dilute solution of sodium carbonate. Another sample was treated with 0.5 percent by weight of maleic anhydride, and the excess anhydride and reaction products again removed by means of a dilute sodium carbonate solution. The breakdown tests as well as the gum contents (copper dish method) were determined for both of the treated samples and also for the untreated sample. These results are given in the following table:

|  | Breakdown test | Gum content |
|---|---|---|
|  | Hours | Milligrams |
| Untreated distillate | 1.9 | 438 |
| Treated with 0.1% maleic anhydride | 2.3 | 342 |
| Treated with 0.5% maleic anhydride | 3.2 | 262 |

Other acids, or anhydrides, which may be used in addition to those of maleic are fumaric, mesaconic, citraconic, itaconic, or other acids especially dibasic acids or compounds which contain the grouping represented by =CH—CO—, as for example quinone, acrolein and sorbic acid.

The quantity of these anhydrides, or acids, which is required for any particular gasoline or other cracked petroleum distillates will usually range from 0.1% to 10% and will vary with the individual anhydride or acid used, and also with the stock being treated. The various stocks will contain different quantities of reactive unsaturated hydrocarbons which should be removed in order to obtain a product which is stable towards oxidation or gum formation. Furthermore, as the different reagents vary among themselves in activity the conditions required to remove the reactive unsaturated hydrocarbons will also vary. It may be desirable or necessary to use a higher temperature with some of the acids mentioned, such as fumaric acid, and under such conditions I prefer to carry out the refining treatment by heating under pressure. These are factors which can be readily determined by test for any particular stock. I have also found it desirable under some circumstances to use the above described process in conjunction with a sulfuric acid treatment of the petroleum distillate, that is, either simultaneously therewith or prior to or following such a treatment. In such a case the acid treatment may range from 1 lb. to 6 lbs. of 98% acid per barrel of distillate treated, and of course must be finished by neutralizing and washing.

My process is not to be limited by any theory as to the mechanism of the reduction of gum formation or sludge formation or to the increased stability of gasolines or cracked gasolines, oils, or other petroleum distillates towards oxidation, nor by the particular substances herein named for illustrative purposes or the quantities used but only to the following claims, by which it is my intention to claim all inherent novelty as broadly as the prior art permits.

I claim:

1. Process of improving a gasoline produced from petroleum and containing highly unsaturated constituents which comprises, treating the gasoline at about refluxing temperature with about 0.1 to 10% of a substance selected from the group consisting of unsaturated acids, acid anhydrides, aldehydes and quinones, containing the grouping represented by =CH—CO—, and separating the reaction products so formed.

2. Process according to claim 1 in which the gasoline is treated with maleic acid or maleic acid anhydride.

3. Process according to claim 1 in which the gasoline is treated with an acid of the fumaric acid type.

4. Process according to claim 1 carried out after a preliminary sulfuric acid treatment corresponding to about 1 to 6 lbs. of 98% acid per barrel of distillate treated.

5. The process of improving a gasoline produced from petroleum and containing highly unsaturated constituents which comprises treating said gasoline with sulfuric acid corresponding to about 1 to 6 lbs. of 98% acid per barrel of gasoline and subsequently subjecting the resultant acid treated gasoline to a treatment at about refluxing temperature with a small amount of maleic anhydride.

CARLETON ELLIS.